(12) United States Patent
Decker et al.

(10) Patent No.: US 12,488,030 B1
(45) Date of Patent: Dec. 2, 2025

(54) SELF-SERVICE QUERY AND ANALYTICS TOOL

(71) Applicant: UIPCO, LLC, San Antonio, TX (US)

(72) Inventors: Brandon Decker, Phoenix, AZ (US); Stephanie Chan, Glendale, AZ (US); Vanessa Bedolla, San Antonio, TX (US); Brooke Talbot, Lindon, UT (US); Lacee Rubio, San Antonio, TX (US); Beaumont Findley, New Braunfels, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 164 days.

(21) Appl. No.: 18/473,738

(22) Filed: Sep. 25, 2023

(51) Int. Cl.
  *G06F 16/30* (2019.01)
  *G06F 3/0482* (2013.01)
  *G06F 16/3329* (2025.01)
  *G06F 16/338* (2019.01)

(52) U.S. Cl.
  CPC ........ *G06F 16/3329* (2019.01); *G06F 3/0482* (2013.01); *G06F 16/338* (2019.01)

(58) Field of Classification Search
  CPC ... G06F 16/3329; G06F 16/338; G06F 3/0482
  See application file for complete search history.

(56) References Cited

U.S. PATENT DOCUMENTS

2015/0248195 A1\* 9/2015 Pathak .................. G06F 3/0482
  715/825
2018/0113578 A1\* 4/2018 Yoon ....................... G06F 16/35

\* cited by examiner

*Primary Examiner* — Ibrahim Siddo
(74) *Attorney, Agent, or Firm* — BakerHostetler (57) ABSTRACT

Systems and methods are provided to receive non-technical inputs and generate encoded queries or instructions to access, retrieve, analyze, and compare data in a database. The systems and methods are further provided to provide visualizations of the data and comparisons between subsets thereof. Machine learning can be utilized to generate the encoded queries or instructions. A sensitivity can be set to facilitate identification of data of interest in visualizations.

20 Claims, 5 Drawing Sheets

SELF-SERVICE QUERY AND ANALYTICS TOOL

TECHNICAL FIELD

The disclosure generally relates to querying large amounts of data, and particularly relates to querying and displaying data from a database without the need for coding.

BACKGROUND

Data continues to grow exponentially through inputs received through a variety of channels. A problem exists in that the amount of data available in myriad contexts exceeds what is usable. Interacting with and leveraging the data often requires a combination of an understanding of the context surrounding the data and the technical databases used to store the data to allow for the design of useful queries and comparisons. This significantly limits the number of users capable of leveraging data, and may necessitate teams of specialized users, rather than one individual user, to exploit available data.

An example of a place where data has continued to grow is in customer service, where a variety of channels are used to communicate with potential and current customers. Contact centers receive information from various messaging channels, including telephone or other voice communication channels, contact functionality built into applications or websites, online text chat, email, social media, et cetera. Contact centers must respond quickly and in some cases in real-time, and so timely, data-validated insights are important to maintaining the target level of service. Decisionmakers are heavily reliant on technical analytical support, and analysts must have a detailed understanding of the contact center and its datapoints to provide useful information to decisionmakers. This decreases tempo and increases labor burden to utilize large data sets.

SUMMARY

In an embodiment, a method comprises receiving, via a graphical user interface, a first input from a user, wherein the first input defines two or more subsets of interaction data in an omnichannel interaction database, wherein the interaction data comprises a plurality of entries representing interactions; receiving, via the graphical user interface, a second input from the user, wherein the second input represents a query for values of one or more parameters of the plurality of entries; converting the second input into a coded query conforming to a query language of the omnichannel interaction database; causing the coded query to run across the two or more subsets of interaction data in the omnichannel interaction database; receiving results of the coded query produced from running the coded query across the two or more subsets of interaction data in the omnichannel interaction database; and providing, via the graphical user interface, the results to the user.

In an embodiment, a system comprises an interface module configured to: receive a first input from a user, wherein the first input defines two or more subsets of interaction data in an omnichannel interaction database, wherein the interaction data comprises a plurality of entries representing interactions, and receive a second input from the user, wherein the second input represents a query for values of one or more parameters of the plurality of entries; an encoding module configured to convert at least one of the first and second inputs into a coded instruction conforming to a language of the omnichannel interaction database, wherein the interface module is configured to cause the coded instruction to run across the two or more subsets of interaction data in the omnichannel interaction database, and wherein the interface module is further configured to receive results of the coded instruction produced from running the coded instruction across the two or more subsets of interaction data in the omnichannel interaction database; and an graphical user interface module configured to provide the results to the user.

In an embodiment, a system comprises means for receiving, via a graphical user interface, a first input from a user, wherein the first input defines two or more subsets of interaction data in an omnichannel interaction database, wherein the interaction data comprises a plurality of entries representing interactions; means for receiving, via the graphical user interface, a second input from the user, wherein the second input represents a query for values of one or more parameters of the plurality of entries; means for converting the second input into a coded query conforming to a query language of the omnichannel interaction database; means for causing the coded query to run across the two or more subsets of interaction data in the omnichannel interaction database; means for receiving results of the coded query produced from running the coded query across the two or more subsets of interaction data in the omnichannel interaction database; and means for providing, via the graphical user interface, the results to the user.

The details above in this Summary are intended to describe only some aspects relating to certain embodiments of the innovations herein, and should not be deemed in any way limiting with respect to requiring or omitting any aspect for embodiments to be claimed or otherwise limiting the disclosure or embodiments keeping with its scope or spirit.

DETAILED DESCRIPTION

Large amounts of data are accessible to larger numbers of people but accessing and interpreting that data remains challenging. Systems that allow customized queries, visualizations, and analytics may require technical personnel to set up certain aspects of such queries, visualizations, and analytics. However, technical personnel may not be the people most familiar with the content of the data. Systems and methods designed to interpret input from laypersons—the individuals who may be most familiar with the data and its use—without the need for coding can reduce labor and improve the use of data by making actionable insights through self-service by non-technical personnel.

As used herein, a "query language" or similar terminology pertaining to coded queries can be a query, command, instruction, et cetera, in languages such as SQL, GQL, PRQL, NIQL, Gremlin, Malloy, et cetera, or various scripting languages such as JavaScript, Perl, PHP, Python, et cetera. As will be discussed, various selected options (which can be static for one or more users, or dynamic for one or more users such that new options can be populated to buttons, menus, or other selections based on, e.g., machine learning used in connection with a record of the queries run across a database) or unconstrained inputs (e.g., natural language, free text, voice inputs) can be interpreted to generate or provide a query or other instruction in the query language, which can be sent to the database or a system in communication therewith. The query or other instruction can be generated or provided using machine learning trained on various inputs and the desired coded outputs, and can use generative artificial intelligence (or other artificial intelligence or machine learning variants) to produce a technical, coded output based on a non-technical input (e.g., natural language or selected options).

The results of queries generated using self-service mechanisms not requiring coding or familiarity with computer query or scripting language can be provided in a graphical user interface that compares different groups of queried results. The graphical user interface can be defined in part based on the inputs received such that subsets of data from the database and queries associated therewith can be allocated particular portions of screen real estate to allow for the plotting, comparison, listing, ranking, display, et cetera, of such details in an output graphical user interface.

Figure 1:
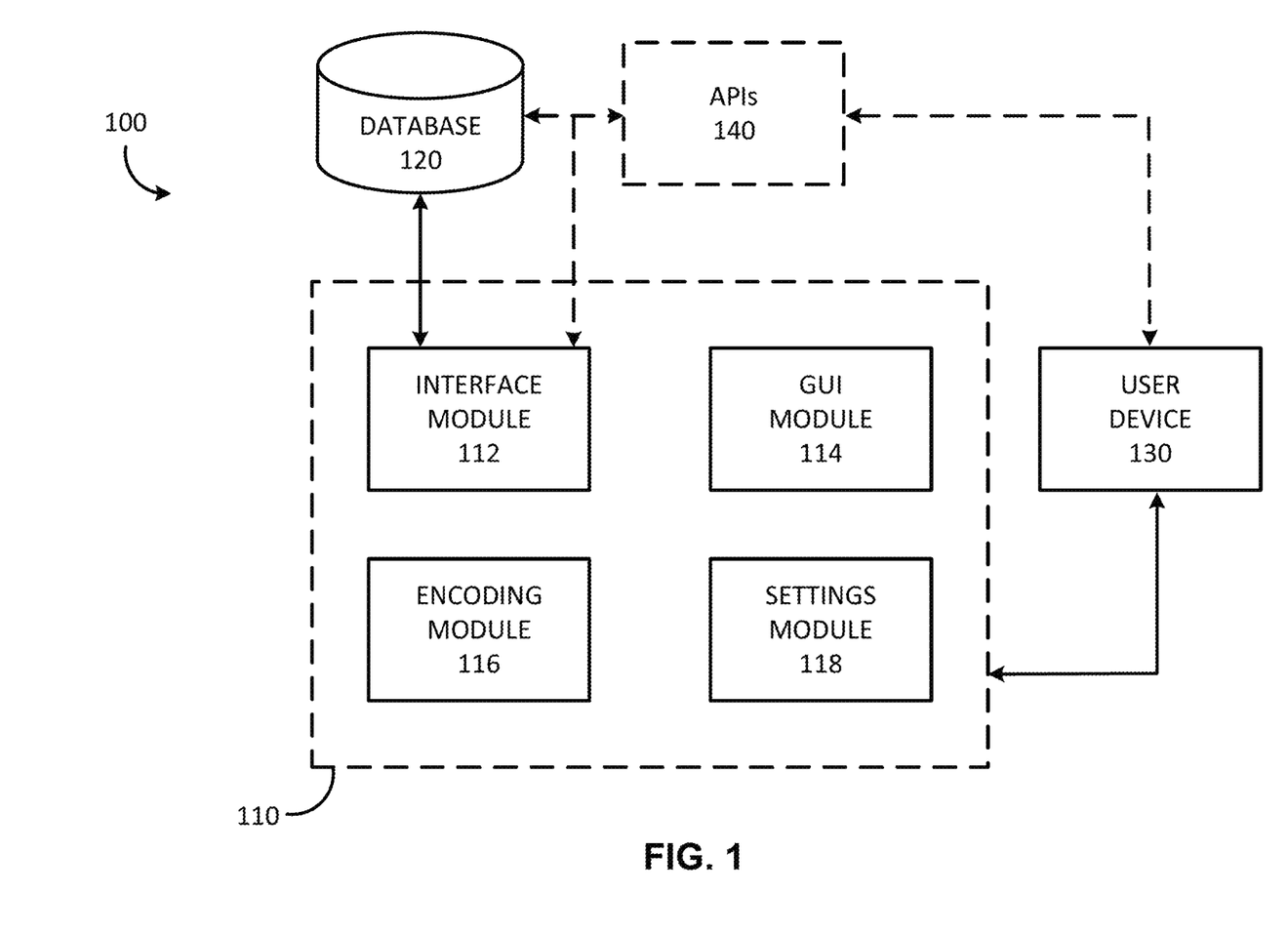
FIG. 1 illustrates a system for generating queries and displaying results disclosed herein.

FIG. 1 illustrates an example system 100 for providing a graphical user interface displaying data analytics without the need for coded or other technical inputs from a user. System 100 includes self-service query tool 110, database 120, and user device 130. In embodiments, system 100 can also include one or more application programming interfaces 140.

Database 120 can be an omnichannel interaction database that stores interaction data and metadata associated therewith. The interaction data can be provided from various contact center systems or channels such as phone systems (voice, short message service, et cetera), chat systems (text, audio, video, et cetera), applications, web forms, social media accounts, et cetera. In embodiments, interaction data can be preprocessed to assist with its use. Preprocessing can be done while interaction data is stored in database 120 or prior to storing interaction data in database 120. Preprocessing can include generating transcripts of audio (or audio portions of video), conforming text to the format of entries for interaction data in database 120, normalizing text or other information for searchability, readability, usability, et cetera.

Self-service query tool 110 is communicatively coupled to omnichannel interaction database 120 at least via interface module 112, which is configured to send information to and receive information from at least database 120 and user device 130. Interface module 112 can be configured to receive one or more inputs from user device 130 communicatively coupled therewith. The one or more inputs can include inputs for defining subsets of information in omnichannel interaction database 120, querying interaction data within omnichannel interaction database, defining aspects for how the results of said queries are returned or output (e.g., what to display, how to display it, the sensitivity or thresholds for displaying or emphasizing comparisons between certain fields, et cetera).

Graphical user interface module 114 can work in concert with interface module 112 to provide a graphical user interface display for inputting the one or more inputs. The input display of graphical user interface module 114 can include, e.g., natural language or free text entry inputs, buttons or menus providing specific options, or combinations thereof. In embodiments, graphical user interface module 114 can also provide an input display with options to record or submit audio or other media to be interpreted as input.

Encoding module 116 is configured to interpret the one or more inputs and to provide coded inputs to facilitate self-service access to database 120. In embodiments, encoding module 116 can interpret a first input representing one or more subsets to be analyzed or compared and provide queries or instructions formatted according to code or language usable with database 120. In embodiments, encoding module 116 can interpret a second input representing one or more queries to search, retrieve, rank, list, or perform other actions on data within the subsets for, e.g., analysis, comparison, and/or display. In embodiments, encoding module 116 can interpret third or other inputs to determine, e.g., graphical user interface arrangements, sensitivity or threshold settings, or other aspects configured through settings module 118 or other modules/subcomponents of self-service query tool 110.

Encoding module 116 can include a machine learning engine configured to interpret non-technical input, enabling the self-service functionality and access to a wider variety of users. Free text or natural language inputs (including audio or other media) and/or combinations of different selections from static or dynamic options can be analyzed using machine learning to determine the subset, query, setting, et cetera, intended with the input. Generative artificial intelligence (and/or other artificial intelligence or machine learning techniques) can be used to generate or provide coded queries, instructions, et cetera, based on the input. The machine learning can be trained on sets of data involving a variety of different phrasings, inputs, or descriptions of, e.g., subsets, queries, settings, et cetera, to make complex queries and analyses available to technical laypersons without coding assistance.

In embodiments, multiple inputs can be combined to constitute a single query or instruction. For example, one or more inputs defining one or more subsets can be received; and one or more inputs defining one or more queries can be received. The subsets can be encoded to define a part of one or more queries, and the queries can be encoded as another part, which are then merged to run the query or queries over the subset or subsets. Whether these instructions are provided sequentially as a subset transmission and a query transmission or provided concurrently as a single combined transmission depends on the configuration and syntax of particular embodiments of database 120.

Graphical user interface module 114 also generates an output display that provides the results of the query for one or more subsets. In embodiments, the output display can be similar to that of FIG. 3, and show comparisons between queried fields for each of the subsets.

As discussed, settings module 118 can receive inputs from user device 130 or other sources to modify settings relating to system 100. Settings module 118 can receive an input relating to a sensitivity to modify how analytics or comparisons are displayed based on their values or differences. Settings module 118 can change the various means of inputs and appearance of outputs and change other settings relevant to how the user provides and receives information in relation to self-service query tool 110.

In embodiments, one or more application programming interfaces 140 can be used. Application programming interfaces 140 can be used to facilitate communication between and among, e.g., self-service query tool 110, user device 130, database 120, and/or other sources of data (e.g., contact centers, social media platforms, account databases, et cetera). In embodiments, interface module and/or encoding module 116, alone or in combination, can be further configured to structure transmissions to comport with one or more requirements for application programming interfaces 140 (based on, e.g., expected message structure to go between the various nodes).

Figure 2:
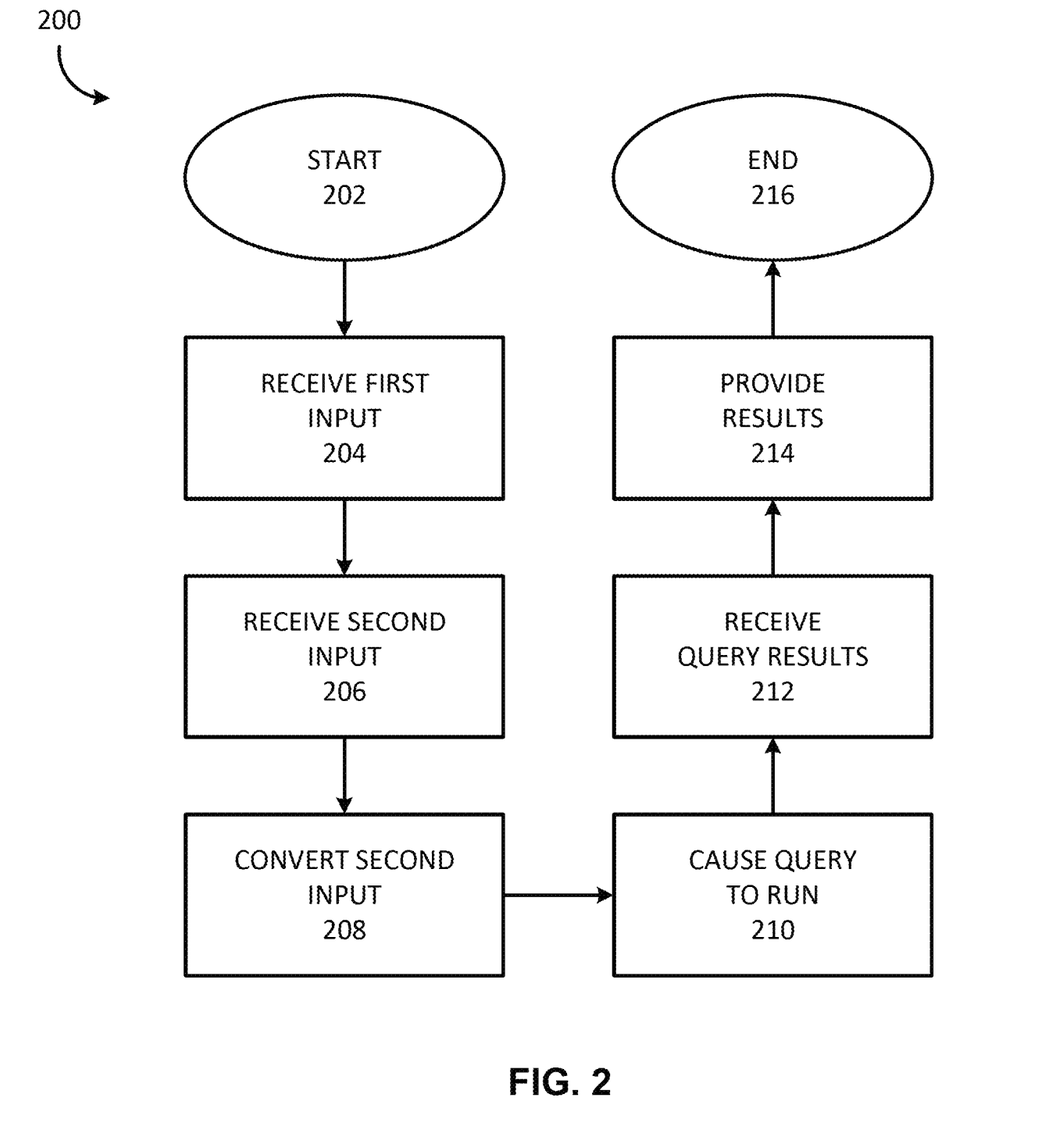
FIG. 2 illustrates a method for generating queries and displaying results disclosed herein.

FIG. 2 illustrates an example methodology 200 for providing self-service functionality for databases requiring technical queries to search or sort data and provide visualizations of outputs representing subsets of that data. Methodology 200 can be implemented using instructions stored on a non-transitory computer-readable medium that can be executed by a processor. The database can be an omnichannel interaction database containing interaction data. The interaction data can be, e.g., call data, chat data, data from texts or app interfaces, email, et cetera. In embodiments, methodology 200 can include one or more preprocessing steps to generate transcripts of audio. In embodiments, a preprocessing step can include normalizing text data to a standard format with different database storage associated with various conversations or interactions and the contributions of each party to such conversations or interactions.

The different interactions (or subsets or pluralities thereof) can be stored in different entries. Entries can include a plurality of fields. Some fields can include the data of the interaction, e.g., text or media. Other fields can include various metadata describing certain aspects of the interaction. Such metadata can include, e.g., duration of interaction (e.g., length of time or number of communications), date, time of day, topics of the interaction (e.g., reason or issue), whether the reason or issue was resolved during that interaction or if follow-up was required, whether a user completed a survey after the interaction, user sentiment, details on a representative involved, details on a member or customer involved (e.g., demographics, account information) et cetera.

Methodology 200 can start at 202 and proceed to 204 where a first input is received. The first input can be received through a graphical user interface configured to accept an input from a user. The input can be in the form of natural language text, non-technical structured text inputs, selections from options or menus, et cetera. The first input defines two or more subsets of interaction data in an omnichannel interaction database. The subsets can be defined based on one or more parameter or metadata fields, or the interaction data entries. For example, a subset could be defined by grouping interactions where the issue was resolved without a subsequent communication, and another subset could be defined according to grouping interactions where the issue was resolved after two or more communications. Subsets could be based on, e.g., customer age, account value, or other entry data or metadata. The headings shown in the graphical user interface of FIG. 3 can all be datapoints used to define subsets. Such examples are not to be interpreted as limiting as the variables, parameters, metadata, et cetera, used to define discrete populations within a data universe are only limited by the organization of the data, and those of skill will appreciate additional data to collect or additional means of organizing said data based on the disclosures herein.

In embodiments, subsets can be defined using pre-populated options. For example, the first input can be selected by the user from a list of common subsets for a cohort associated with the user. In another example, the first input can be selected by the user from a list of predicted subsets for the user. Such predicted subsets can be generated using machine learning trained on data describing subsets selected by a plurality of users. In embodiments, the omnichannel interaction database can store information regarding the subsets defined or received by inputs to provide common subsets or data for training machine learning on subsets. In embodiments where free form or multiple data inputs are received, defining subsets based on the first input can use machine learning to recognize an intent of the input. This can be performed as, e.g., converting the second input at 208 described below.

At 206, a second input is received via the graphical user interface. The second input can represent a query for values of one or more fields of entries within the subsets. For example, the second input can be a request for statistics or different metrics relating to or comparing each subset. These statistics or metrics can be returned in a form suitable for their concurrent display, plotting, ranking, et cetera.

At 208, the second input can be converted to code or a technical form for a query to access the omnichannel interaction database and define the graphical user interface that will display at least a portion of the result of the query. For example, a free form text input can be provided to represent a technical query. Machine learning can be trained based on a variety of varied and natural inputs and the desired outputs to recognize non-technical inputs and generate a technical query (e.g., syntactically correct query in a query language).

In embodiments, a draft query output can be provided that shows the query (or queries) along with a description thereof. The user can be permitted to confirm a query or revise or refine the query. In embodiments, confirmation, revision, or refinement can be performed using the same prompt, and machine learning can be used to recognize non-technical inputs until the desired queries are correctly identified.

In alternative or complementary embodiments one or more queries can be selected using the second input using pre-populated options, which can include common queries or queries predicted for the user or a group of users. In embodiments, the omnichannel interaction database can store information regarding the queries received by inputs to provide common queries or data for training machine learning on queries.

At 210, the query as-coded can be caused to run on the database, and at 212 query results can be received. The results can be shown to the user at 214. In embodiments, the results can be provided in a graphical user interface like that of FIG. 3. The different sections of the graphical user interface can be defined using, e.g., the first and second inputs.

In embodiments, the results visually represent a comparison of one or more parameters for each of the two or more subsets (using, e.g., bar charts, distributions, plots, lists, rankings, et cetera). The appearance of the comparison can based upon a difference in the parameters between any two of the two or more subsets crossing a significance threshold.

In embodiments, methodology 200 can include receiving a third input, wherein the third input defines the significance threshold. The significance threshold can be a difference at which data will be displayed or emphasized, such that identical or similar datapoints across the subsets are not displayed or emphasized and the user is presented with information showing where differences exist between the subsets. In embodiments, queried data can all be displayed, and differences above the significance threshold can be highlighted, annotated with an icon or image, and/or be displayed according to a different color scheme (e.g., yellow as opposed to blue). In embodiments, two or more significance thresholds can be set for two or more variables or fields.

After the query is run and results provided, methodology 200 can recycle to any other step of the method or end at 216.

Figure 3:
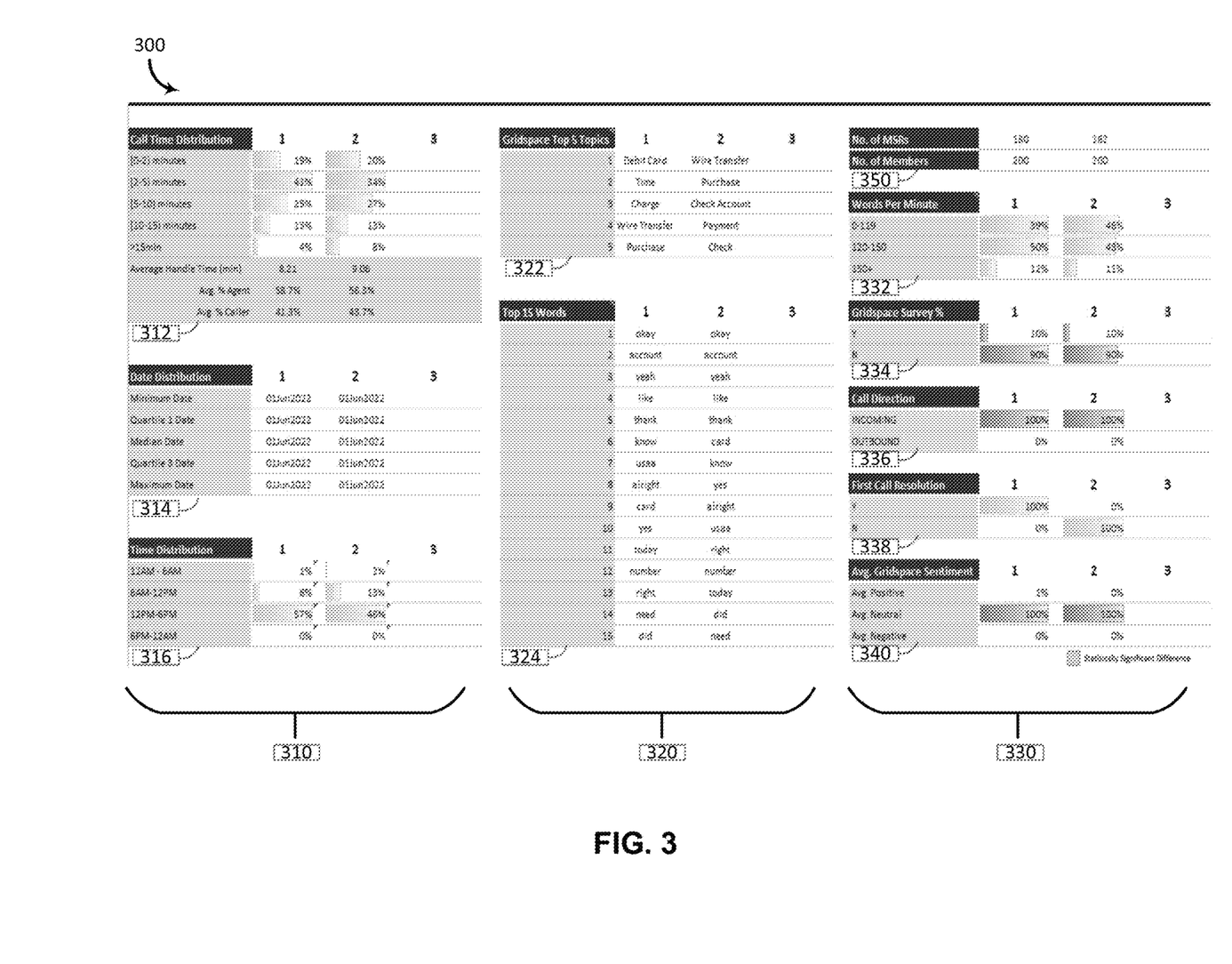
FIG. 3 illustrates a graphical user interface for displaying query results disclosed herein.

FIG. 3 illustrates an example results graphical user interface 300 showing the output of a query as disclosed herein. Results graphical user interface 300 includes various sections for depicting various details pertaining to query results or analytics. These can include, e.g., demographics section 310, analytics section 320, behavior section 330, and context section 350.

Data to populate results graphical user interface 300 is queried from subsets of interaction data in, e.g., an omnichannel interaction database. For example, subsets of data therein could be to draw the population (or a population) of interactions where 1) the issue was resolved on the first interaction (e.g., first call, first chat, first email) and 2) the issue required a subsequent interaction (e.g., callback, additional chat, additional emails). In FIG. 3, these could represent the first two columns for each portion of the display, which are shown as populated with data. A third column is shown unpopulated, which could be another population or subset for comparison. In alternative embodiments, four or more subsets can be reflected for each comparison, adding more columns than is shown in FIG. 3. In still further alternate embodiments, one or two column embodiments could be utilized, allowing more screen real estate to be dedicated to a two population comparison or review of statistics for a single population.

Demographics section 310 allows for the review or comparison of interaction parameters relating to certain interaction demographics. The example demographics provided include Call Time Distribution 312, Date Distribution 314, and Time Distribution 316. Within each respective subset, the values or proportions of these subsets falling within different ranges (for Call Time Distribution 312 and Time Distribution 316) and statistical values (for Date Distribution 314) are shown as text strings or charts.

Analytics section 320 allows for the review or comparison of interaction parameters relating to certain interaction analytics. The example analytics include Top 5 Topics 322 and Top 15 Words 324. Within each respective subset, the top-ranked values occurring in the entries within each subset are shown as text strings.

Behavior section 330 allows for the review or comparison of interaction parameters relating to certain behavioral measures. The example behavioral measures include Words Per Minute 332 (e.g., rate of speech), Survey Completion Percent 334 (e.g., what proportions of people interacting completed a voluntary survey after their issue was addressed), Call Direction 336, First Call Resolution 338, and Sentiment 340. Within each respective subset, the values or proportions of those subsets falling within different ranges can be depicted graphically.

Context section 350 shows information about selected subsets. Here, the number of member service representatives ("MSRs") and the number of members (customers) is shown for each, indicating that the populations of interactions involved 200 unique members each, and that the first subset had 180 unique representatives involved in the interactions with those 200 members, and the second subset had 182 unique representatives involved in the interactions with those 200 members.

In embodiments, further processing can be performed on results before displaying in results graphical user interface 300. For example, for Top 15 Words 324, certain words can be filtered to provide more useful responses. In one further example, articles, conjunctions, and other common words that may not convey information about the conversation (e.g., "the" or "and") can be excluded from displayed results. In another example, outliers can be identified (e.g., by looking at standard deviations or using other statistical techniques) and excluded from the results within a population.

In embodiments, statistically significant differences, or differences exceeding a threshold, as between or among the different subsets queried, can include visual emphases. These can include, e.g., showing the charts or numbers in different colors or with different accents, adding icons or alerts to particular parameters or comparisons, or others.

In embodiments, users can set a sensitivity for identifying the manner in which a difference is highlighted. Graphical user interface 300 can include a button, pop-up, or other element to change sensitivity within an existing output, or the sensitivity can be set before graphical user interface 300 is rendered.

Figure 4:
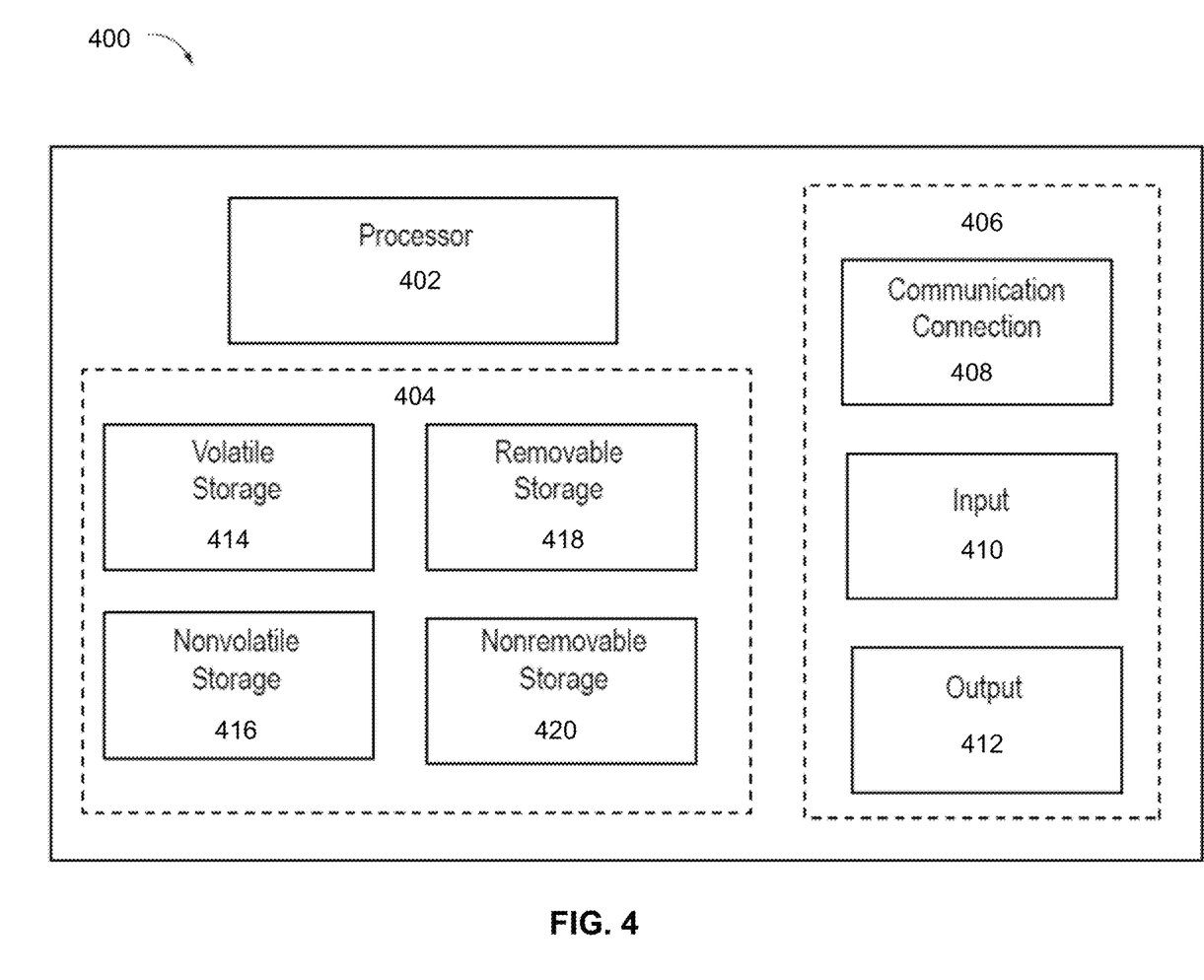
FIG. 4 depicts an example computing environment for implementing certain aspects disclosed herein.

As shown in FIG. 4, device 400 may comprise all or a part of system 100 and/or implement some or all of system 100 or method 200. Device 400 may comprise hardware or a combination of hardware and software. The functionality to facilitate telecommunications via a telecommunications network may reside in one or combination of network devices 400. Device 400 depicted in FIG. 4 may represent or perform functionality of an appropriate device 400, or combination of network devices 400, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 2 is an example and not intended to imply a limitation to a specific implementation or configuration. Thus, device 400 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Device 400 may comprise a processor 402 and a memory 404 coupled to processor 402. Memory 404 may contain executable instructions that, when executed by processor 402, cause processor 402 to effectuate operations associated with mapping wireless signal strength. As evident from the description herein, device 400 is not to be construed as software per se.

In addition to processor 402 and memory 404, device 400 may include an input/output system 406. Processor 402, memory 404, and input/output system 406 may be coupled together (coupling not shown in FIG. 2) to allow communications therebetween. Each portion of device 400 may comprise circuitry for performing functions associated with each respective portion. Thus, each portion may comprise hardware, or a combination of hardware and software. Accordingly, each portion of device 400 is not to be construed as software per se. Input/output system 406 may be capable of receiving or providing information from or to a communications device or other network entities configured for telecommunications. For example, input/output system 406 may include a wireless communications (e.g., WiFi/2G/

3G/4G/5G/GPS) card. Input/output system 406 may be capable of receiving or sending video information, audio information, control information, image information, data, or any combination thereof. Input/output system 406 may be capable of transferring information with device 400. In various configurations, input/output system 406 may receive or provide information via any appropriate means, such as, for example, optical means (e.g., infrared), electromagnetic means (e.g., radio frequency (RF), WiFi, Bluetooth®, Zig-Bee®), acoustic means (e.g., speaker, microphone, ultrasonic receiver, ultrasonic transmitter), or a combination thereof. In an example configuration, input/output system 406 may comprise a WiFi finder, a two-way GPS chipset or equivalent, or the like, or a combination thereof.

Input/output system 406 of device 400 also may contain communication connection 408 that allows device 400 to communicate with other devices, network entities, or the like. Communication connection 408 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 406 also may include an input device 410 such as keyboard, mouse, pen, voice input device, or touch input device. Input/output system 406 may also include an output device 412, such as a display, speakers, or a printer.

Processor 402 may be capable of performing functions associated with telecommunications, such as functions for processing broadcast messages, as described herein. For example, processor 402 may be capable of, in conjunction with any other portion of device 400, determining a type of broadcast message and acting according to the broadcast message type or content, as described herein.

Memory 404 of device 400 may comprise a storage medium having a concrete, tangible, physical structure. As is known, a signal does not have a concrete, tangible, physical structure. Memory 404, as well as any computer-readable storage medium described herein, is not to be construed as a signal. Memory 404, as well as any computer-readable storage medium described herein, is not to be construed as a transient signal. Memory 404, as well as any computer-readable storage medium described herein, is not to be construed as a propagating signal. Memory 404, as well as any computer-readable storage medium described herein, is to be construed as an article of manufacture.

Memory 404 may store any information utilized in conjunction with telecommunications. Depending upon the exact configuration or type of processor, memory 404 may include a volatile storage 414 (such as some types of random access memory (RAM)), a nonvolatile storage 416 (such as ROM, flash memory), or a combination thereof. Memory 404 may include additional storage (e.g., a removable storage 418 or a nonremovable storage 420) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by device 400. Memory 404 may comprise executable instructions that, when executed by processor 402, cause processor 402 to effectuate operations to map signal strengths in an area of interest.

Figure 5:
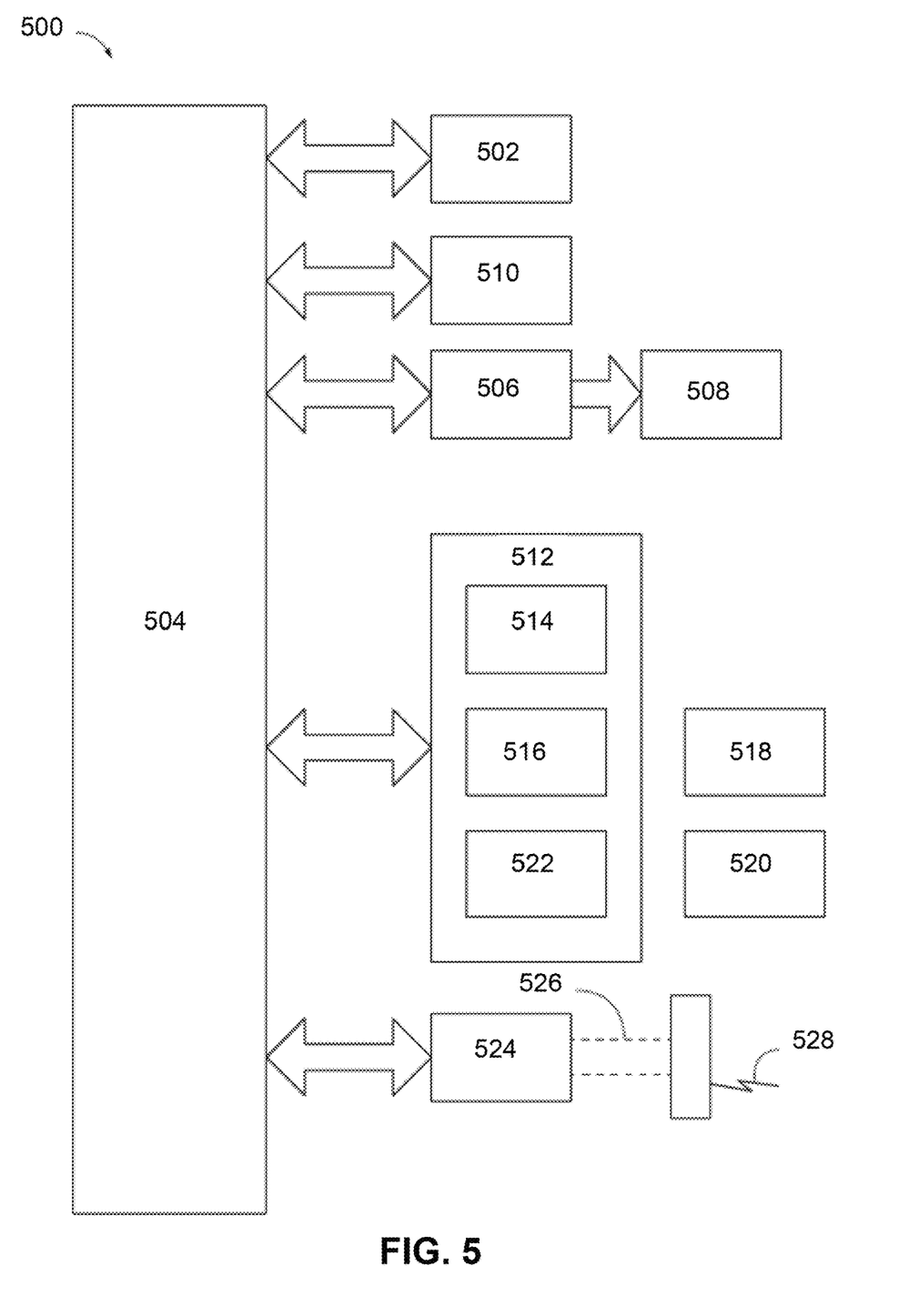
FIG. 5 depicts an example network environment for implementing certain aspects disclosed herein.

FIG. 5 illustrates a computer-based system 500 that may constitute or include parts of system 100 and/or implement some or all of method 200. Computer-based system 500 includes at least one processor, such as a processor 502. Processor 502 may be connected to a communication infrastructure 504, for example, a communications bus, a cross-over bar, a network, or the like. Various software aspects are described in terms of this example computer-based system 500. Upon perusal of the present description, it will become apparent to a person skilled in the relevant art(s) how to implement the present disclosure using other computer systems or architectures.

Computer-based system 500 includes a display interface 506 that forwards graphics, text, or other data from communication infrastructure 504 or from a frame buffer (not shown) for display on a display unit 508.

Computer-based system 500 further includes a main memory 510, such as random access memory (RAM), and may also include a secondary memory 512. Secondary memory 512 may further include, for example, a hard disk drive 514 or a removable storage drive 516, representing a floppy disk drive, a magnetic tape drive, an optical disk drive, etc. Removable storage drive 516 reads from or writes to a removable storage unit 518 in a well-known manner. Removable storage unit 518 may represent a floppy disk, magnetic tape, or an optical disk, and may be read by and written to by removable storage drive 516. As will be appreciated, removable storage unit 518 includes a computer usable storage medium having computer software or data stored therein.

In accordance with various aspects of the present disclosure, secondary memory 512 may include other similar devices for allowing computer programs or other instructions to be loaded into computer-based system 500. Such devices may include, for example, a removable storage unit 520 and an interface 522. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from removable storage unit 520 to computer-based system 500.

Computer-based system 500 may further include communication interface 524. Communication interface 524 may allow software or data to be transferred between computer-based system 500 and external devices. Examples of communication interface 524 include, but may not be limited to a modem, a network interface (such as an Ethernet card), a communications port, a Personal Computer Memory Card International Association (PCMCIA) slot and card, or the like. Software or data transferred via communication interface 524 may be in the form of a number of signals, hereinafter referred to as signals 526, which may be electronic, electromagnetic, optical or other signals capable of being received by communication interface 524. Signals 526 may be provided to communication interface 524 via a communication path (e.g., channel) 528. Communication path 528 carries signals 526 and may be implemented using wire or cable, fiber optics, a telephone line, a cellular link, an RF link, or other communication channels.

In this document, the terms "computer program medium" and "computer usable medium" are used to generally refer to media such as removable storage drive 516, a hard disk installed in hard disk drive 514, or the like. These computer program products provide software to computer-based system 500. The present disclosure is directed to such computer program products.

Computer programs (also referred to as computer control logic) may be stored in main memory 510 or secondary memory 512. The computer programs may also be received via communication interface 504. Such computer programs, when executed, enable computer-based system 500 to perform the functions consistent with the present disclosure, as discussed herein. In particular, the computer programs, when executed, enable processor 502 to perform the features of the present disclosure. Accordingly, such computer programs represent controllers of computer-based system 500.

In accordance with an aspect of the present disclosure, where the disclosure is implemented using a software, the software may be stored in a computer program product and loaded into computer-based system 500 using removable storage drive 516, hard disk drive 514, or communication interface 524. The control logic (software), when executed by processor 502, causes processor 502 to perform the functions of the present disclosure as described herein.

In another aspect, the present disclosure is implemented primarily in hardware using, for example, hardware components, such as application specific integrated circuits (ASIC). Implementation of the hardware state machine to perform the functions described herein will be apparent to persons skilled in the relevant art(s). In yet another aspect, the present disclosure is implemented using a combination of both the hardware and the software. In another aspect, the present disclosure is implemented using software.

A "module" or "component" herein can refer to a portion of a system, implemented locally or remotely or in combinations of local and remote systems, configured to perform a function that can be implemented using software, hardware, or combinations thereof in the above-described computing and network environments.

Various aspects disclosed herein are to be taken in the illustrative and explanatory sense and should in no way be construed as limiting of the present disclosure. All numerical terms, such as, but not limited to, "first" and "second" or any other ordinary or numerical terms, should also be taken only as identifiers, to assist the reader's understanding of the various aspects, variations, components, or modifications of the present disclosure, and may not create any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above-described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

The present disclosure is described herein with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These software elements may be loaded onto a general-purpose computer, special purpose computer, or other programmable data-processing apparatus to produce a machine, such that the instructions that execute on the computer or other programmable data-processing apparatus create means for implementing the functions specified in the flowchart block or blocks. These computer program instructions may also be stored in a computer-readable memory that can direct a computer or other programmable data-processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational steps to be performed on the computer or other programmable apparatus to produce a computer-implemented process, such that the instructions that execute on the computer or other programmable apparatus provide steps for implementing the functions specified in the flowchart block or blocks. In an aspect, the computer program instructions may be executed on any remote-hosted application framework, for example, by a processor associated with a cloud server.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

The systems, methods and computer program products disclosed in conjunction with various aspects of the present disclosure are embodied in systems and methods for facilitating multiple types of communications via a network based portal.

While aspects of the present disclosure have been particularly shown and described with reference to the examples above, it will be understood by those skilled in the art that various combinations of the disclosed aspects or additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

What is claimed is:

1. A method comprising executing instructions stored on a non-transitory computer-readable medium with a processor to effect operations comprising:
   receiving, via a graphical user interface, a first input from a user, wherein the first input defines two or more subsets of interaction data in an omnichannel interaction database, wherein the interaction data comprises a plurality of entries representing interactions;
   receiving, via the graphical user interface, a second input from the user, wherein the second input represents a query for values of one or more parameters of the plurality of entries;
   converting the second input into a coded query conforming to a query language of the omnichannel interaction database;
   causing the coded query to run across the two or more subsets of interaction data in the omnichannel interaction database;
   receiving results of the coded query produced from running the coded query across the two or more subsets of interaction data in the omnichannel interaction database; and
   providing, via the graphical user interface, the results to the user.

2. The method of claim 1, wherein the results visually represent a comparison of one or more parameters for each of the two or more subsets.

3. The method of claim 2, wherein a visualization of the comparison is based upon a difference in the parameters between any two of the two or more subsets crossing a significance threshold.

4. The method of claim 3, wherein the operations comprise:
   receiving a third input, wherein the third input defines the significance threshold.

5. The method of claim 1, wherein the first input is selected by the user from a list of common subsets for a cohort associated with the user.

6. The method of claim 1, wherein the first input is selected by the user from a list of predicted subsets for the user.

7. The method of claim 6, wherein the predicted subsets for the user are generated using machine learning trained on data describing subsets selected by a plurality of users.

8. The method of claim 1, wherein the second input is selected by the user from a list of common queries for a cohort associated with the user.

9. The method of claim 1, wherein the second input is selected by the user from a list of predicted queries for the user.

10. The method of claim 9, wherein the predicted queries for the user are generated using machine learning trained on data describing queries submitted by a plurality of users.

11. The method of claim 1, wherein the second input is provided by the user in free-form text.

12. The method of claim 11, comprising storing information regarding at least one of subsets identified within the omnichannel interaction database and queries run on the omnichannel interaction database in the omnichannel interaction database.

13. The method of claim 11, wherein machine learning trained on natural language inputs associated with the queries run on the omnichannel interaction database and a plurality of coded queries respectively associated therewith interprets the free-form text to generate the coded query.

14. A system, comprising a non-transitory computer-readable medium storing instructions that when executed by a processor effectuate:
   an interface module configured to:
      receive a first input from a user, wherein the first input defines two or more subsets of interaction data in an omnichannel interaction database, wherein the interaction data comprises a plurality of entries representing interactions, and
      receive a second input from the user, wherein the second input represents a query for values of one or more parameters of the plurality of entries;
   an encoding module configured to convert at least one of the first and second inputs into a coded instruction conforming to a language of the omnichannel interaction database,
      wherein the interface module is configured to cause the coded instruction to run across the two or more subsets of interaction data in the omnichannel interaction database, and
      wherein the interface module is further configured to receive results of the coded instruction produced from running the coded instruction across the two or more subsets of interaction data in the omnichannel interaction database; and
   a graphical user interface module configured to provide the results to the user.

15. The system of claim 14, wherein executing the instructions effectuates:
   a settings module configured to change a setting relating to at least the graphical user interface module based on a third input, wherein the interface module is configured to receive the third input.

16. The system of claim 15, wherein the setting is a sensitivity relating to a comparison between the results pertaining to two of the two or more subsets.

17. The system of claim 14, wherein the interface module is operatively coupled with one or more application programming interfaces, wherein the one or more application programming interfaces are configured to send data to and receive data from at least one of the database and a user device.

18. The system of claim 14, wherein at least one of the first input and the second input are provided by the user in free-form text.

19. The system of claim 18, wherein machine learning trained on natural language inputs associated with the queries run on the omnichannel interaction database and a plurality of coded instructions respectively associated therewith interprets the free-form text to generate the coded instruction.

20. A system, comprising:
   means for receiving, via a graphical user interface, a first input from a user, wherein the first input defines two or more subsets of interaction data in an omnichannel interaction database, wherein the interaction data comprises a plurality of entries representing interactions;
   means for receiving, via the graphical user interface, a second input from the user, wherein the second input represents a query for values of one or more parameters of the plurality of entries;
   means for converting the second input into a coded query conforming to a query language of the omnichannel interaction database;
   means for causing the coded query to run across the two or more subsets of interaction data in the omnichannel interaction database;

means for receiving results of the coded query produced from running the coded query across the two or more subsets of interaction data in the omnichannel interaction database; and means for providing, via the graphical user interface, the results to the user.

* * * * *